(12) United States Patent
Sugiura

(10) Patent No.: US 11,422,418 B2
(45) Date of Patent: *Aug. 23, 2022

(54) LIQUID CRYSTAL DEVICE AND ELECTRONIC APPARATUS

(71) Applicant: SEIKO EPSON CORPORATION, Tokyo (JP)

(72) Inventor: Yukihiro Sugiura, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/177,212

(22) Filed: Feb. 17, 2021

(65) Prior Publication Data

US 2021/0255512 A1   Aug. 19, 2021

(30) Foreign Application Priority Data

Feb. 18, 2020  (JP) .............................. JP2020-024981

(51) Int. Cl.
  *G02F 1/1362*  (2006.01)
(52) U.S. Cl.
  CPC .. *G02F 1/136209* (2013.01); *G02F 1/136286* (2013.01)
(58) Field of Classification Search
  CPC ......... G02F 1/136209; G02F 1/136286; G02F 1/13394; G02F 1/13396; G02F 1/133345
  See application file for complete search history.

(56) References Cited

U.S. PATENT DOCUMENTS

| 5,880,797 | A | 3/1999 | Yamada et al. |
| 6,927,820 | B2 * | 8/2005 | Jang .................. G02F 1/133512 |
| | | | 349/114 |
| 2002/0063841 | A1 | 5/2002 | Hirakata et al. |
| 2019/0265540 | A1 | 8/2019 | Terada et al. |

FOREIGN PATENT DOCUMENTS

| JP | 2005121805 | 5/2005 |
| JP | 2007187720 | 7/2007 |
| JP | 2011186365 | 9/2011 |
| JP | 2014098914 | 5/2014 |
| JP | 2019148625 | 9/2019 |

* cited by examiner

*Primary Examiner* — Dung T Nguyen
(74) *Attorney, Agent, or Firm* — JCIPRNET

(57) ABSTRACT

A liquid crystal device is provided with a first light shielding member, a second light shielding member, a third light shielding member, and a fourth light shielding member along an edge of a pixel electrode, and liquid crystal molecules intersect a first direction X and a second direction Y and are oriented toward a second intersection region between the third light shielding member and the fourth light shielding member. A convex portion extending along an end portion of the pixel electrode is provided at a lower layer side of the pixel electrode, and the pixel electrode overlaps with the convex portion in a region overlapping with the third light shielding member and the fourth light shielding member. The convex portion is separated from an adjacent pixel electrode in plan view, and is not linked to the convex portion that overlaps with the adjacent pixel electrode.

8 Claims, 13 Drawing Sheets

LIQUID CRYSTAL DEVICE AND ELECTRONIC APPARATUS

The present application is based on, and claims priority from JP Application Serial Number 2020-024981, filed Feb. 18, 2020, the disclosure of which is hereby incorporated by reference herein in its entirety.

BACKGROUND

1. Technical Field

The present disclosure relates to a liquid crystal device and an electronic apparatus.

2. Related Art

A liquid crystal device includes a first substrate having a surface provided with a plurality of pixel electrodes having translucency and a first oriented film covering the plurality of pixel electrodes, a second substrate having a surface facing the first substrate and provided with a second oriented film adjacent to the surface, and a liquid crystal layer provided between the first substrate and the second substrate. End portions of the plurality of pixel electrodes each overlap with a first light shielding portion extending in a first direction and a second light shielding portion extending in a second direction. In such a liquid crystal device, a configuration is proposed in which an opening portion enclosed by the first light shielding portion and the second light shielding portion has a size in the second direction that is smaller than a size in the first direction, and a width in the second direction of the first light shielding portion is greater than a width in the first direction of the second light shielding portion (see JP 2019-148625 A). Additionally, shifting of a center of each pixel electrode toward an orientation of a pre-tilt of liquid crystal molecules in a direction along the second direction with respect to a center of the opening portion is proposed. According to such a configuration, even when an orientation of the liquid crystal molecules is disturbed due to an effect of a lateral electric field generated between adjacent pixel electrodes in the second direction, a range in which such a disturbed region protrudes from the second light shielding portion can be made narrower, thus, deterioration in display quality caused by the lateral electric field can be suppressed.

However, in the technique described in JP 2019-148625 A, structure is adopted in which a width of the light shielding portion in a portion where the disturbance in the orientation caused by the lateral electric field occurs is widened and the effect of the lateral electric field is hidden, thus, the width of the light shielding portion is widened in order to reliably hide the disturbance in the orientation caused by the lateral electric field. As a result, a reduction in an amount of displayed light occurs. Thus, in the configuration described in JP 2019-148625 A, there is a problem in that deterioration in quality of an image caused by the disturbance in the orientation of the liquid crystal molecules caused by the lateral electric field cannot be appropriately suppressed.

SUMMARY

In order to solve the above-described problem, an aspect of a liquid crystal device according to the disclosure includes a liquid crystal layer including liquid crystal molecules, a first light shielding member extending along a first direction, a second light shielding member extending along a second direction that intersects the first direction, a third light shielding member intersecting the second light shielding member and extending along the first direction, a fourth light shielding member intersecting the first light shielding member and the third light shielding member and extending along the second direction, a transistor provided corresponding to an intersection region between the third light shielding member and the fourth light shielding member, and an insulating member including a pixel electrode provided corresponding to the transistor and provided such that an end portion is aligned with each of the first light shielding member, the second light shielding member, the third light shielding member and the fourth light shielding member, and a convex portion provided along the end portion of the pixel electrode between a layer provided with the first light shielding member, the second light shielding member, the third light shielding member, and the fourth light shielding member, and a layer provided with the pixel electrode, wherein, for the liquid crystal molecules, in a region provided with the pixel electrode in plan view, an orientation direction is set in a direction intersecting the first direction and the second direction and heading toward the intersection region, and the convex portion overlaps in plan view with the pixel electrode in a region along the third light shielding member and a region along the fourth light shielding member, and is separated from a pixel electrode adjacent to the pixel electrode in plan view.

The liquid crystal device according to the disclosure can be used for various electronic apparatuses.

BRIEF DESCRIPTION OF THE DRAWINGS

FIG. 10 is an explanatory diagram illustrating an effect of a convex portion on a lateral electric field illustrated in FIG. 7 and the like.

DESCRIPTION OF EXEMPLARY EMBODIMENTS

Exemplary embodiments of the disclosure will be described below with reference to the drawings. The accompanying drawings to be referenced are appropriately scaled up or down or otherwise exaggerated to allow parts to be described in a fully recognizable manner. Other components than components needed to be described may sometimes be omitted. In addition, in the description below, the term "when viewed in plan view" represents a state viewed from a normal direction with respect to a first substrate 10 and a pixel electrode 9a.

Exemplary Embodiment 1

1. Configuration of Liquid Crystal Device

Figure 1:
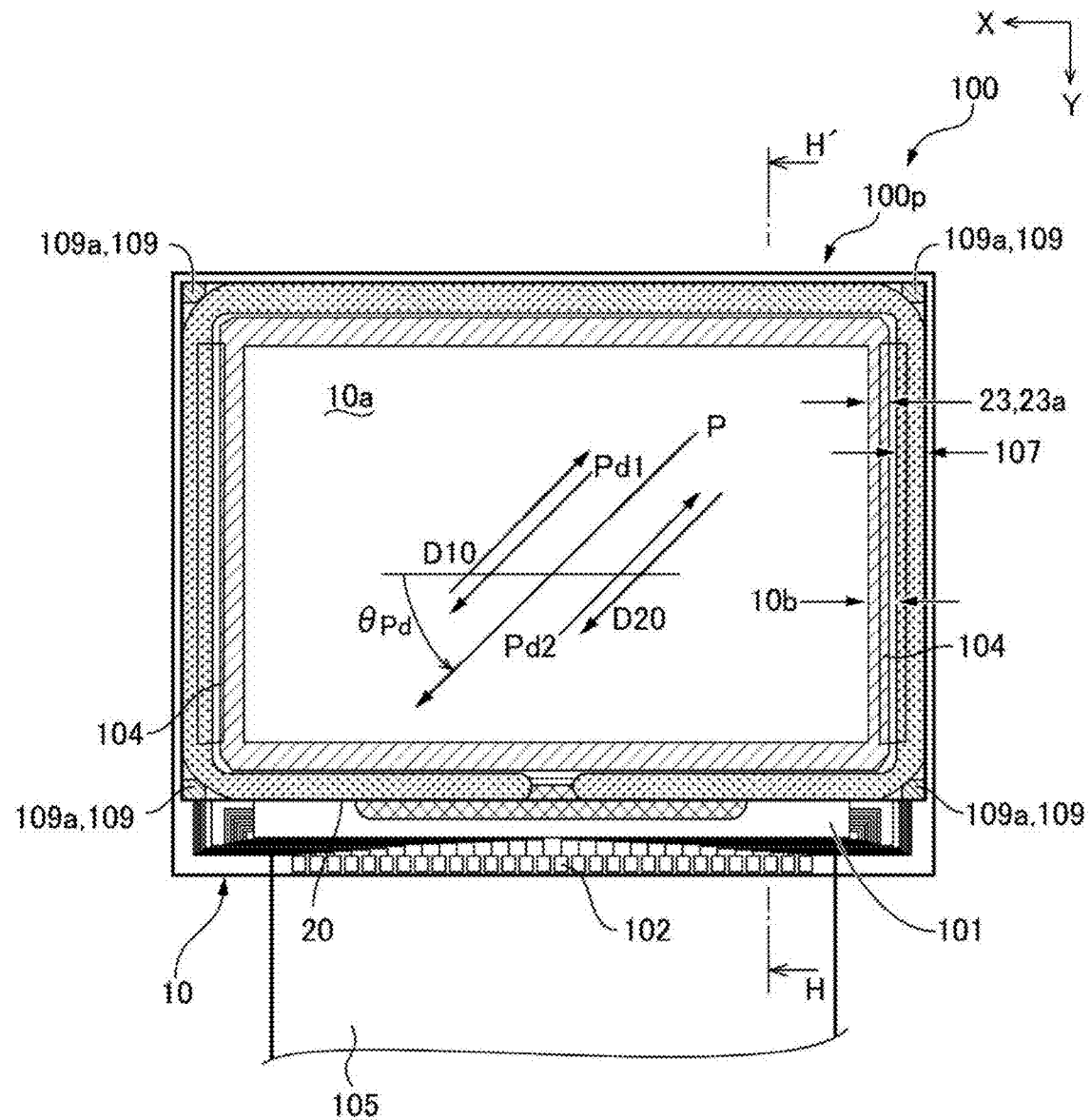
FIG. 1 is a plan view illustrating a specific configuration example of a liquid crystal device according to Exemplary Embodiment 1 of the disclosure.
Figure 2:
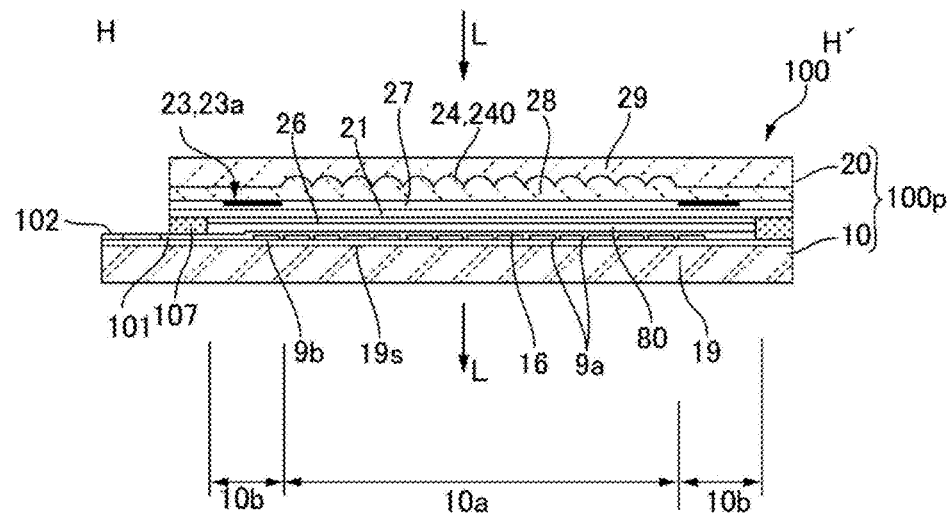
FIG. 2 is an H-H' cross-sectional view of the liquid crystal device illustrated in FIG. 1.

FIG. 1 is a plan view illustrating a specific configuration example of a liquid crystal device 100 according to Exemplary Embodiment 1 of the disclosure. FIG. 1 illustrates a state where the liquid crystal device 100 is viewed from the side of a second substrate 20. FIG. 2 is the H-H' cross-sectional view of the liquid crystal device 100 illustrated in FIG. 1.

As illustrated in FIGS. 1 and 2, the liquid crystal device 100 includes a liquid crystal panel 100p including the light-transmitting first substrate 10 and a light-transmitting second substrate 20 bonded to each other by a sealing material 107 in a predetermined gap. The sealing material 107 is provided along an outer edge of the second substrate 20 to have a frame shape, and a liquid crystal layer 80 is disposed in a region surrounded by the sealing material 107 between the first substrate 10 and the second substrate 20.

The first substrate 10 and the second substrate 20 both have a quadrangle shape, and in a substantially center portion of the liquid crystal device 100, a display region 10a is provided as a rectangular region where a size in a 0300-0900 o'clock direction (a size in a first direction X) is longer than a size in a 0000-0600 o'clock direction (a size in a second direction Y). In accordance with the above shapes, the sealing material 107 is also formed in a substantially rectangular frame-shape, and a peripheral region 10b in a quadrangular frame-shape is provided between an inner peripheral edge of the sealing material 107 and an outer peripheral edge of the display region 10a.

The first substrate 10 includes a transmissive substrate main body 19 such as quartz or glass. The first substrate 10 has a surface (surface 10s) facing the second substrate 20. Outside of the display region 10a on the surface 10s, a data line driving circuit 101 and a plurality of terminals 102 are formed along one side of the first substrate 10. The one side extends in the first direction X of the first substrate 10 on a side of 0600 o'clock. Scan line driving circuits 104 are respectively further formed along two sides of the first substrate 10. The two sides extend in the second direction Y. A flexible wiring substrate 105 is coupled to the terminal 102, and various potentials and various signals are input to the first substrate 10 via the flexible wiring substrate 105.

In the display region 10a on one surface 10s of the first substrate 10, a plurality of pixel electrodes 9a having translucency and formed of transmissive conductive film such as ITO (Indium Tin Oxide) film or the like, and a transistor for pixel switching (not illustrated) electrically coupled to each of the plurality of pixel electrodes 9a are formed in a matrix pattern. A first oriented film 16 is formed at the second substrate 20 side with respect to the pixel electrodes 9a. Accordingly, the first oriented film 16 from the substrate main body 19 corresponds to the first substrate 10.

The second substrate 20 includes a transmissive substrate main body 29 such as quartz or glass. The second substrate 20 has a surface (surface 20s) facing the first substrate 10. Adjacent to the surface 20s, a common electrode 21 having translucency and made from an ITO film, for example, is formed. A second oriented film 26 is formed adjacent to the first substrate 10 with respect to the common electrode 21. Accordingly, the second oriented film 26 from the substrate main body 29 corresponds to the second substrate 20. The common electrode 21 is formed substantially entirely at the second substrate 20.

Opposite to the first substrate 10 with respect to the common electrode 21, a light shielding film 23 made of metal, a metal compound, or the like and having light shielding properties and a protective film 27 having translucency are formed. The light shielding film 23 is formed, for example, as a partition 23a in a frame shape extending along the outer peripheral edge of the display region 10a. The light shielding film 23 may be formed in a black matrix in a lattice shape in regions overlapping, when viewed in plan view, with regions each between adjacent ones of the pixel electrodes 9a. Regions overlapping, when viewed in plan view, with the partition 23a in the peripheral region 10b of the first substrate 10 are formed with dummy pixel electrodes 9b formed simultaneously with the pixel electrodes 9a.

A lens 24 facing each of the plurality of pixel electrodes 9a is configured at the second substrate 20. Thus, a lens surface including a concave surface 240 is formed at the substrate main body 29, and the concave surface 240 is covered by a lens layer 28. The lens layer 28 has a refractive index larger than a refractive index of the substrate main body 29. For example, the substrate main body 29 is formed of a quartz substrate (silicon oxide, $SiO_2$), and has the refractive index of 1.48. Meanwhile, the lens layer 28 is formed of a silicon oxynitride film (SiON), and has the refractive index from 1.58 to 1.68. Thus, the lenses 24 have positive power for converging light. In the exemplary embodiment, the light shielding film 23 and the protective film 27 are formed at a side of the first substrate 10 with respect to the lens layer 28.

The first substrate 10 includes an inter-substrate conduction electrode 109 being formed in a region positioning outside the sealing material 107 and overlapping with a corner portion of the second substrate 20 such that electrical conduction is established between the first substrate 10 and the second substrate 20. An inter-substrate conduction material 109a including conductive particles is disposed in the inter-substrate conduction electrode 109. The common electrode 21 of the second substrate 20 is electrically coupled to the first substrate 10 side via the inter-substrate conduction material 109a and the inter-substrate conduction electrode 109. Therefore, a common potential is applied to the common electrode 21 from the first substrate 10 side.

The liquid crystal device 100 of Exemplary Embodiment 1 is configured as a transmissive-type liquid crystal device. The transmissive-type liquid crystal device displays an image in such a manner that light incident from one substrate side of the first substrate 10 and the second substrate 20 is modulated while transmitting the other substrate side to be emitted. In the exemplary embodiment, while light entered from the second substrate 20, as indicated by an arrow L in FIG. 2, passes through and exits from the first substrate 10, the light is modulated by the liquid crystal layer 80 for each of the pixels. An image is thus displayed.

2. Electrical Configuration of Liquid Crystal Device 100

Figure 3:
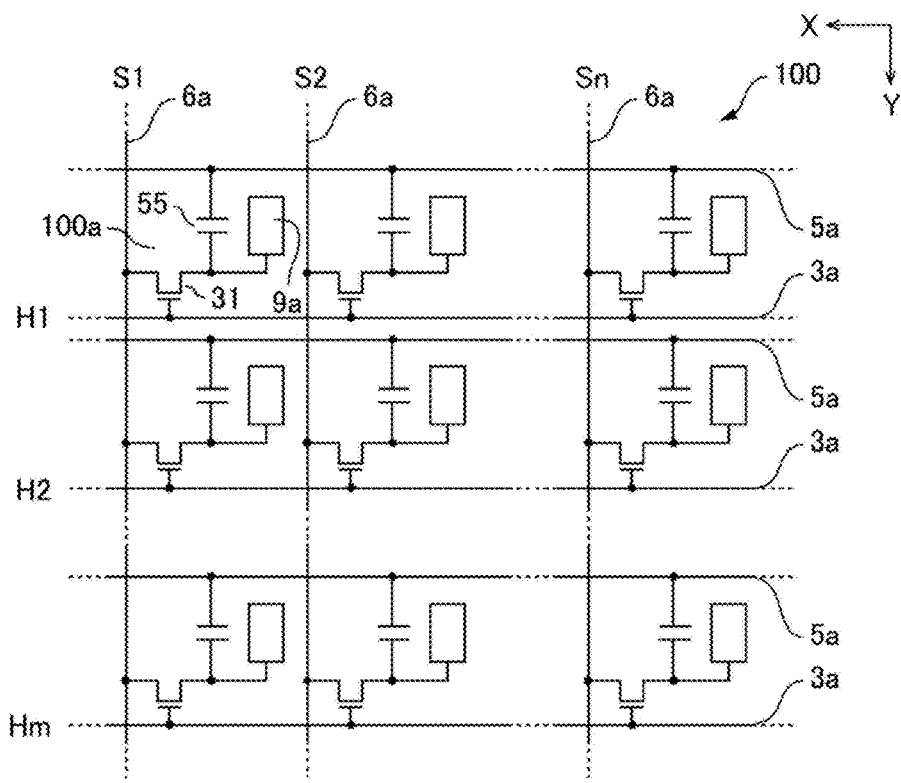
FIG. 3 is an explanatory diagram illustrating an electrical configuration of the liquid crystal device illustrated in FIG. 1.

FIG. 3 is an explanatory view illustrating an electrical configuration of the liquid crystal device 100 illustrated in FIG. 1. As illustrated in FIG. 3, in the display region 10a of the liquid crystal device 100, for a plurality of pixels 100a formed in matrix, the pixel electrodes 9a and a transistor 31 corresponding to the pixel electrode 9a are formed. Data lines 6a configured to supply image signals S1, S2, . . . Sn are electrically coupled to sources of the transistors 31. The image signals S1, S2, . . . Sn to be written in the data lines 6a may be sequentially supplied to the lines in the stated order, or may be supplied for each group including the plurality of data lines 6a that are adjacent to each other. Scan lines 3a are electrically coupled to gates of the transistors 31, and configured that scanning signals H1, H2, . . . Hm are sequentially applied to the scan lines 3a in a pulse in the stated order at a predetermined timing. The pixel electrodes 9a are electrically coupled to drains of the transistors 31, and write the image signals S1, S2, . . . Sn, which are supplied from the data lines 6a, in each of the pixels 100a at a predetermined timing by turning the transistors 31 into an ON-state for a certain time period. In this manner, the image signals S1, S2, . . . Sn that are written in the pixels 100a via the pixel electrodes 9a are retained for a certain time period together with the common electrode 21 of the second substrate 20 described with reference to FIG. 2. In the liquid crystal layer 80, orientation and order of molecular assembly are changed by a level of voltage to be applied, and accordingly, the liquid crystal layer 80 modulates the light and enables gradation display. Therefore, the light having contrast corresponding to the image signals S1, S2, . . . Sn exits from the liquid crystal device 100.

Here, in some cases, in order to prevent the image signals S1, S2, . . . Sn retained for each of the pixels 100a from leaking, each retaining capacity 55 may be added in parallel with liquid crystal capacity formed between each of the pixel electrodes 9a and the common electrode 21 by using capacitance lines 5a. In this case, the voltage of each of the pixel electrodes 9a is retained by the retaining capacity 55 for a time period longer than a time period for which the source voltage is applied. With this, a charge retention property is improved, and the liquid crystal device 100 of an active matrix type with a high contrast ratio can be achieved.

3. Configuration of Liquid Crystal Layer 80 and Other Components

Figure 4:
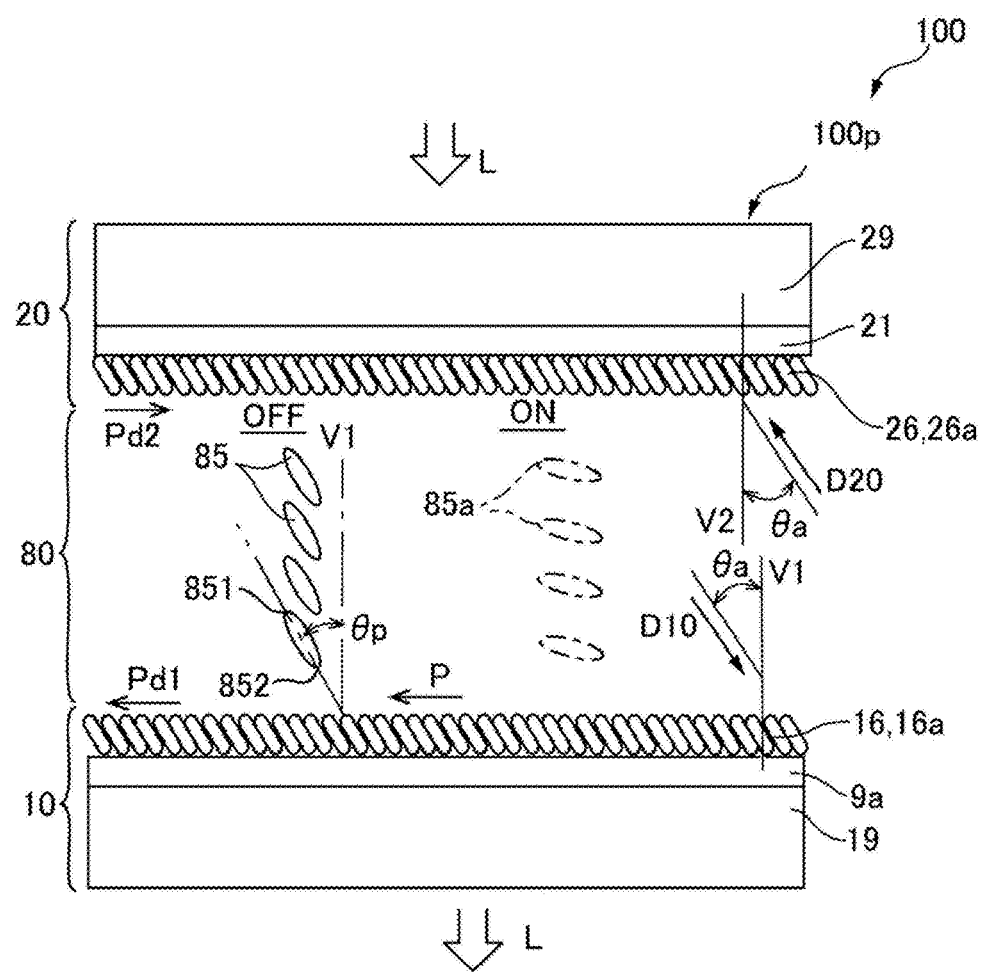
FIG. 4 is an explanatory diagram of liquid crystal molecules and the like used in the liquid crystal device illustrated in FIG. 1.

FIG. 4 is an explanatory diagram illustrating liquid crystal molecules 85 and the like used in the liquid crystal device 100 illustrated in FIG. 1. In FIG. 4, the first oriented film 16 and the second oriented film 26 include a polyimide film or an inorganic orientation film. In the exemplary embodiment, the first oriented film 16 and the second oriented film 26 are oblique deposition films (inorganic oriented films) made of $SiO_x$ (x<2), $SiO_2$, $TiO_2$, MgO, or $Al_2O_3$, for example.

Accordingly, the first oriented film 16 and the second oriented film 26 each include a columnar structure in which respective columnar bodies 16a and 26a each named a column are obliquely formed with respect to both the first substrate 10 and the second substrate 20. Thus, in the first oriented film 16 and the second oriented film 26, the liquid crystal molecules 85 having negative dielectric anisotropy and used in the liquid crystal layer 80 are oriented diagonally with respect to the first substrate 10 and the second substrate 20 to allow the liquid crystal molecules 85 to be pre-tilted. While no voltage is applied between each of the pixel electrodes 9a and the common electrode 21, a pre-tilt angle θp denotes an angle formed between a vertical direction (normal line direction) with respect to the first substrate 10 and the second substrate 20 and a long axis direction (orientation direction) of the liquid crystal molecules 85. The pre-tilt angle θp substantially ranges from 3° to 5°, for example.

A pre-tilt orientation Pd1 of the liquid crystal molecules 85 with respect to the first substrate 10 represents an orientation in which a first end portion 851 opposite to the first substrate 10 of the liquid crystal molecules 85 in the long axis direction is located with respect to a second end portion 852 on the first substrate 10 side. In the liquid crystal device 100, when a drive voltage is applied between the pixel electrodes 9a and the common electrode 21, the liquid crystal molecules 85 incline in the pre-tilt orientation Pd1. A pre-tilt orientation Pd2 of the liquid crystal molecules 85 with respect to the second substrate 20 is antiparallel to the pre-tilt orientation Pd1 of the liquid crystal molecules 85 with respect to the first substrate 10. Hereinafter, the pre-tilt orientation Pd1 is an orientation direction of the liquid crystal molecules 85 (pre-tilt direction P).

In this way, the liquid crystal device 100 is configured as a liquid crystal device of a Vertical Alignment (VA) mode. In addition, the liquid crystal device 100 is disposed between a pair of polarized light elements disposed in a crossed Nichol manner such that the pre-tilt orientation Pd1, that is the pre-tilt direction, forms an angle θP of 45°, with respect to a transmission axis or an absorption axis of the pair of polarized light elements. Transmittance of incident light therefore increases in accordance with a voltage applied between each of the pixel electrodes 9a and the common electrode 21 for each of the pixels. An image is displayed in the normally black mode where the pixels in the liquid crystal device 100 wholly emit light at a degree of contrast in accordance with an image signal.

In the exemplary embodiment, as illustrated in FIG. 1, a vapor deposition direction D10 when forming the first oriented film 16 is an orientation heading from 0730 o'clock toward 0130 o'clock, and an angle formed by the vapor deposition direction D10 with a normal line V1 with respect to the first substrate 10 is θa (see FIG. 4). At that time, a direction in which the columnar bodies 16a grow is an orientation heading from 0730 o'clock toward 0130 o'clock. Thus, the pre-tilt orientation Pd1, which is the pre-tilt direction of the liquid crystal molecules 85 with respect to the first substrate 10 is an orientation heading from 0130 o'clock toward 0730 o'clock. A vapor deposition direction D20 when forming the second oriented film 26 is an orientation heading from 0130 o'clock toward 0730 o'clock, and an angle formed by the vapor deposition direction D20 with a normal line V2 with respect to the second substrate 20 is θa (see FIG. 4). At that time, a direction in which the columnar bodies 26a grow is an orientation heading from 0730 o'clock toward 0130 o'clock. Thus, the pre-tilt orientation Pd2 of the liquid crystal molecules 85 with respect to the second substrate 20 is the orientation heading from 0130 o'clock toward 0730 o'clock. Therefore, the pre-tilt orientations Pd1 and Pd2 of the liquid crystal molecules 85 intersect each of the first direction X and the second direction Y at an angle of 45°. In the exemplary embodiment, the orientation direction (pre-tilt direction P) of the liquid crystal molecules 85 is a direction along the pre-tilt orientations Pd1 and Pd2, and is a direction in which 0130 o'clock and 0730 o'clock are linked.

4. Specific Configuration of Pixel

Figure 5:
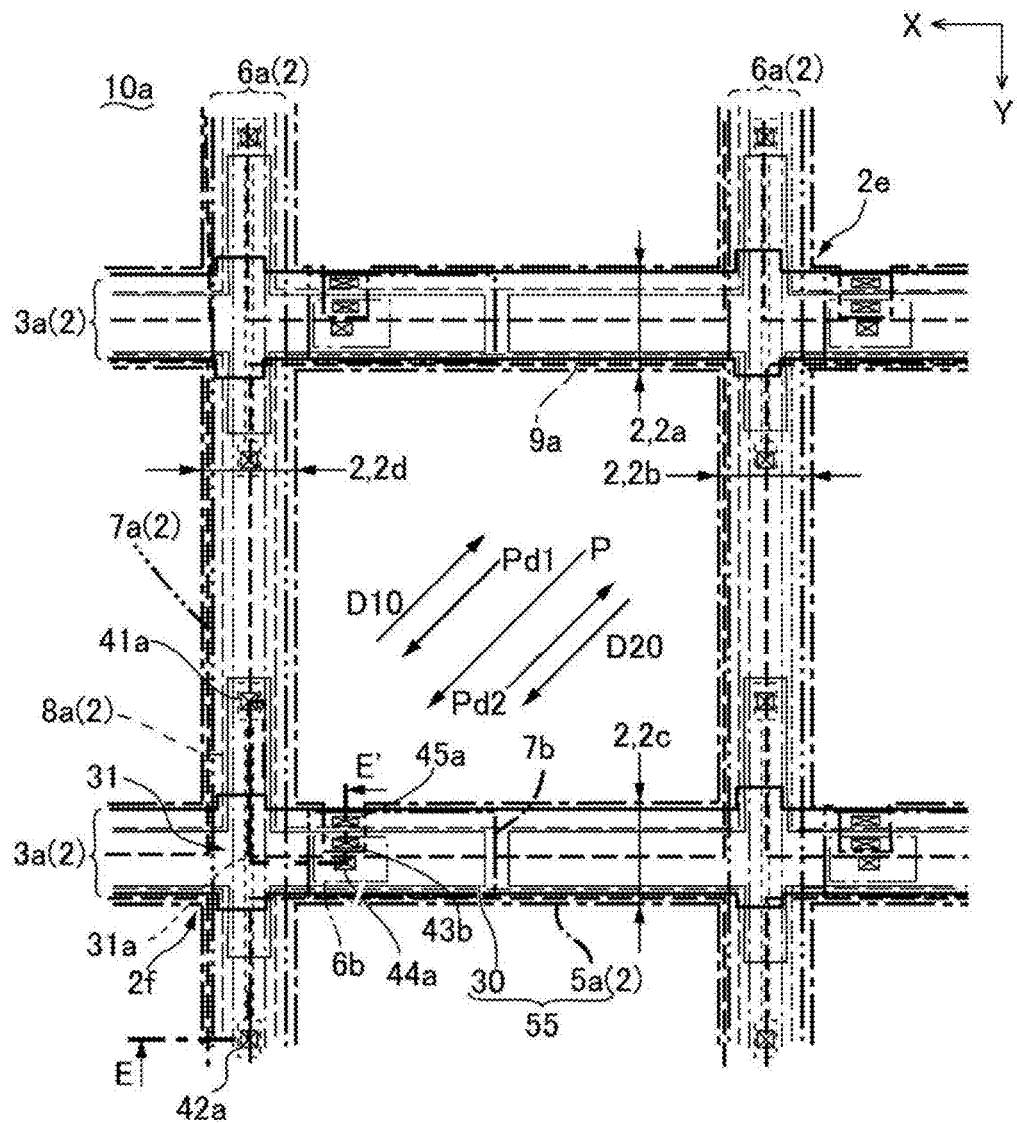
FIG. 5 is a plan view of a pixel of the liquid crystal device illustrated in FIG. 1.
Figure 6:
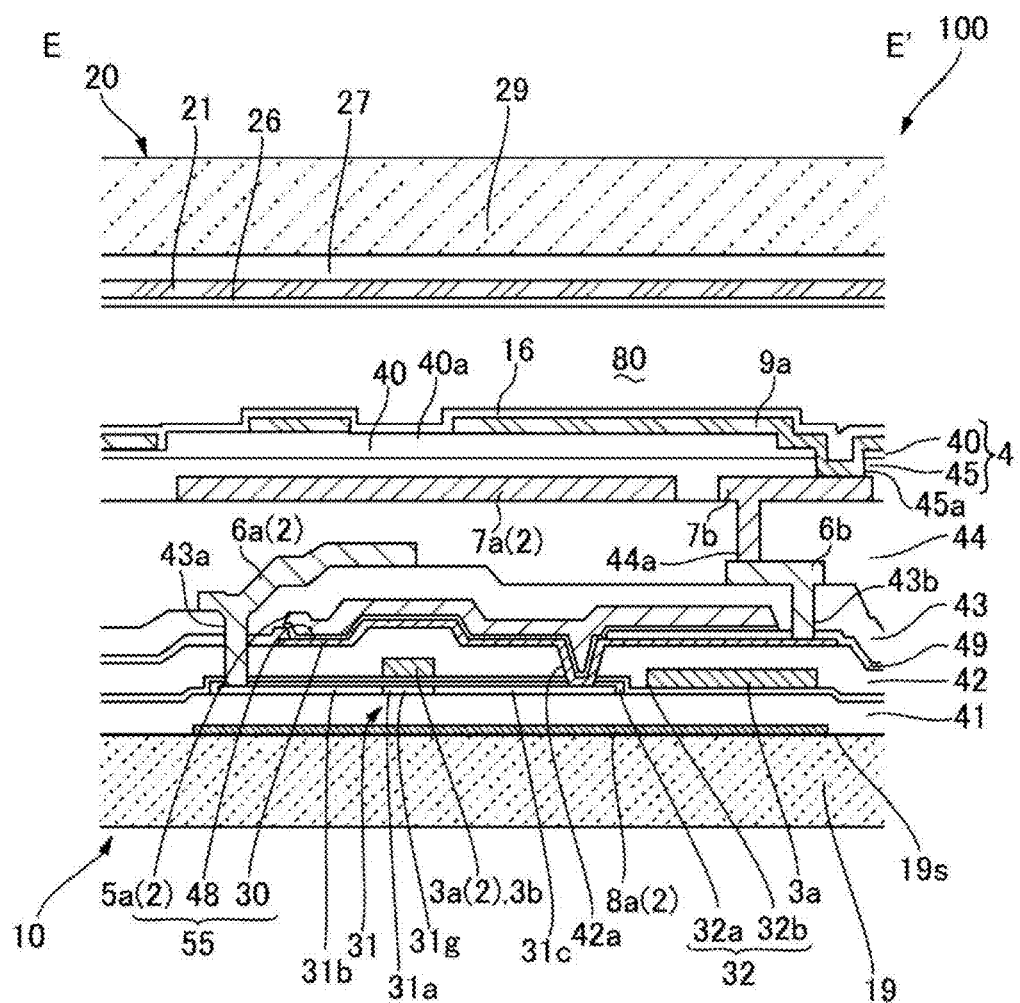
FIG. 6 is an E-E' cross-sectional view of the pixel illustrated in FIG. 5.

FIG. 5 is a plan view of the pixel of the liquid crystal device 100 illustrated in FIG. 1. FIG. 6 is the E-E' cross-sectional view of the pixel illustrated in FIG. 5. Note that, in FIG. 5, each layer is indicated by a line described below. Moreover, note that, in FIG. 5, as for layers including ends overlapping each other in plan view, positions of the end portions are displaced to make shapes and the like of the layers readily recognizable.

A first light shielding film 8*a*: a thin and long dashed line

A semiconductor film 31*a*: a thin and short dotted line

The scan line 3*a*: a thick solid line

A drain electrode 30: a thin solid line

The data line 6*a* and a relay electrode 6*b*: a thin long dashed short dashed line The capacitance line 5*a*: a thick long dashed short dashed line A second light shielding film 7*a* and a relay electrode 7*b*: a thick long dashed double-short dashed line The pixel electrode 9*a*: a thick dashed line As illustrated in FIG. 5, the surface 10*s* of the first substrate 10 is formed with the plurality of pixel electrodes 9*a*, and the data lines 6*a* and the scan lines 3*a* are formed along inter-pixel regions sandwiched by the pixel electrodes 9*a* adjacent to each other. The inter-pixel regions extend lengthwise and crosswise. The scan lines 3*a* linearly extend along first inter-pixel regions extending in the first direction X of the inter-pixel regions, and the data lines 6*a* linearly extend along second inter-pixel regions extending in the second direction Y of the inter-pixel regions. Further, the transistors 31 and the pixel electrodes 9*a* are formed to correspond to intersections between the data lines 6*a* and the scan lines 3*a*, and the transistors 31 are formed by using intersection regions between the data lines 6*a* and the scan lines 3*a* and the vicinities of the intersection regions. The capacitance lines 5*a* are formed at the first substrate 10, and a common potential Vcom is applied to the capacitance lines 5*a*. The capacitance lines 5*a* extend to overlap the scan lines 3*a* and the data line 6*a*, and are formed to have a lattice shape. At an upper layer side of the transistor 31, the second light shielding film 7*a* is formed, and the second light shielding film 7*a* extends to overlap with the data lines 6*a*. At a lower layer side of the transistor 31, the first light shielding film 8*a* is formed, and the first light shielding film 8*a* extends to overlap with the scan lines 3*a* and the data lines 6*a*.

In this manner, a grid shaped light shielding member 2 extending along end portions of the plurality of pixel electrodes 9*a* is formed by the first light shielding film 8*a*, the scan line 3*a*, the capacitance line 5*a*, the data line 6*a*, and the second light shielding film 7*a*.

As illustrated in FIG. 6, the surface 10*s* of the first substrate 10 is formed with the first light shielding film 8*a* including a conductive film such as a conductive polysilicon film, a metal silicide film, a metal film, or a metal compound film. The first light shielding film 8*a* includes, for example, a light shielding film of tungsten silicide (WSi), tungsten, or titanium nitride, and prevents the light from entering the semiconductor film 31*a* and causing an erroneous operation in the transistor 31 due to photoelectric current. The first light shielding film 8*a* may be configured as a scan line. In this case, the following configuration to be described later is obtained. That is, the gate electrode 3*b* and the first light shielding film 8*a* are brought into conduction with each other.

At the first substrate 10, on an upper layer side of the first light shielding film 8*a*, a transmissive inter-layer insulating film 41 including, for example, a silicon oxide film is formed. At an upper layer side of the inter-layer insulating film 41, the transistor 31 including the semiconductor film 31*a* is formed. The transistor 31 is a Thin Film Transistor (TFT), which includes the semiconductor layer 31*a* and the gate electrode 3*b*. The semiconductor film 31*a* has long sides oriented in an extending direction of the data line 6*a*. The gate electrode 3*b* extends in a direction orthogonal to the longitudinal direction of the semiconductor film 31*a*, and overlaps with a central part of the semiconductor film 31*a* in the longitudinal direction. In the exemplary embodiment, the gate electrode 3*b* includes a part of the scan line 3*a*. The transistor 31 includes a transmissive gate insulating film 32 between the semiconductor film 31*a* and the gate electrode 3*b*. The semiconductor film 31*a* includes a channel region 31*g* facing the gate electrode 3*b* via the gate insulating film 32, and also includes a source region 31*b* and a drain region 31*c* on one side and the other side of the channel region 31*g*, respectively. The transistor 31 has an LDD structure. Thus, on both the sides of the channel region 31*g*, each of the source region 31*b* and the drain region 31*c* has a low-concentration region. In a region adjacent to a side opposite to the channel region 31*g* with respect to the low-concentration region, each of the source region 31*b* and the drain region 31*c* has a high-concentration region.

The semiconductor film 31*a* includes, for example, a polysilicon film (polycrystalline silicon film). The gate insulating film 32 has a two-layer structure including a first gate insulating film 32*a* including a silicon oxide film that is obtained by thermally oxidizing the semiconductor film 31*a*, and a second gate insulating film 32*b* including a silicon oxide film that is formed by using, for example, the low pressure CVD method. The gate electrode 3*b* and the scan line 3*a* each include a conductive film such as a conductive polysilicon film, a metal silicide film, a metal film, or a metal compound film.

At an upper layer side of the gate electrode 3*b*, a transmissive inter-layer insulating film 42 including, for example, a silicon oxide film is formed. At an upper layer of the inter-layer insulating film 42, a drain electrode 30 is formed. The drain electrode 30 includes a conductive film such as a conductive polysilicon film, a metal silicide film, a metal film, or a metal compound film. The drain electrode 30 is formed to have a part overlapping with the drain region 31*c* of the semiconductor film 31*a*, and is brought into conduction with the drain region 31*c* via a contact hole 42*a* passing through the inter-layer insulating film 42 and the gate insulating film 32.

At an upper layer side of the drain electrode 30, a transmissive etching stopper film 49 including, for example, a silicon oxide film and a transmissive dielectric film 48 are formed. At an upper layer side of the dielectric film 48, the capacitance line 5*a* is formed. As the dielectric film 48, a silicon compound such as a silicon oxide film or a silicon nitride film can be used. In addition, a dielectric film having a high dielectric constant such as an aluminum oxide film, a titanium oxide film, a tantalum oxide film, a niobium oxide film, a hafnium oxide film, a lantern oxide film, and a zirconium oxide film can be used. The capacitance line 5*a* includes a conductive film such as a conductive polysilicon film, a metal silicide film, a metal film, or a metal compound film. The capacitance line 5a overlaps with the drain electrode 30 via the dielectric film 48, and forms the retaining capacity 55.

At an upper layer side of the capacitance line 5a, a transmissive inter-layer insulating film 43 including, for example, a silicon oxide film is formed. At an upper layer side of the inter-layer insulating film 43, the data line 6a and the relay electrode 6b are formed of the same conductive film. The data line 6a and the relay electrode 6b each include a conductive film such as a conductive polysilicon film, a metal silicide film, a metal film, or a metal compound film. The data line 6a is brought into conduction with the source region 31b via a contact hole 43a passing through the inter-layer insulating film 43, the etching stopper film 49, the inter-layer insulating film 42, and the gate insulating film 32. The relay electrode 6b is brought into conduction with the drain electrode 30 via a contact hole 43b passing through the inter-layer insulating film 43 and the etching stopper film 49.

At an upper layer side of the data line 6a and the relay electrode 6b, a transmissive inter-layer insulating film 44 including, for example, a silicon oxide film is formed. At an upper layer side of the inter-layer insulating film 44, the second light shielding film 7a and the relay electrode 7b are formed of the same conductive film. The inter-layer insulating film 44 includes a flattened surface. The second light shielding film 7a and the relay electrode 7b include a conductive film such as a conductive polysilicon film, a metal silicide film, a metal film, or a metal compound film. The relay electrode 7b is in conduction with the relay electrode 6b via a contact hole 44a passing through the inter-layer insulating film 44. The second light shielding film 7a extends to overlap with the data line 6a. Note that, the second light shielding film 7a may be brought into conduction with the capacitance line 5a and be applied with the common potential Vcom, which is a constant potential, to be used as a shield.

At an upper layer side of the second light shielding film 7a and the relay electrode 7b, a transmissive first insulating film 45 including, for example, a silicon oxide film is formed. At an upper layer side of the first insulating film 45, the pixel electrode 9a including an ITO film is formed. A contact hole 45a reaching the relay electrode 7b is formed in the first insulating film 45. The pixel electrode 9a is electrically coupled to the relay electrode 7b via the contact hole 45a. As a result, the pixel electrode 9a is electrically coupled to the drain region 31c via the relay electrode 7b, the relay electrode 6b, and the drain electrode 30. The first insulating film 45 includes a flattened surface. The first oriented film 16 is formed at surfaces of the pixel electrodes 9a.

In the exemplary embodiment, a transmissive second insulating film 40 is formed between the pixel electrode 9a and the first insulating film 45, and the first insulating film 45 and the second insulating film 40 constitute an insulating member 4.

5. Layout of Light Shielding Member 2 and the Like

Figure 7:
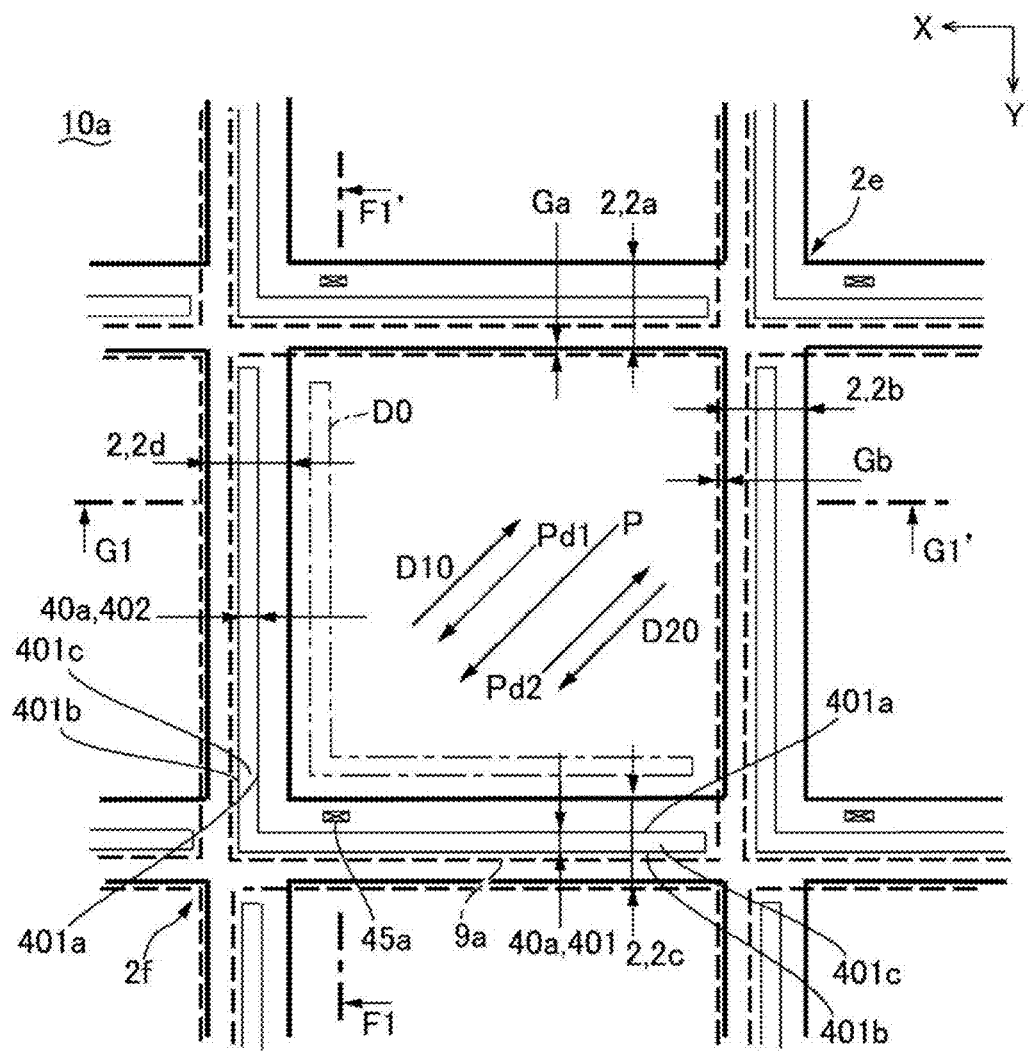
FIG. 7 is an explanatory diagram schematically illustrating a layout of a pixel electrode and a light shielding member illustrated in FIG. 5.

FIG. 7 is an explanatory diagram schematically illustrating a layout of the light shielding member 2 illustrated in FIG. 5. Note that, in FIG. 7, each layer is indicated by a line described below. In addition, in a liquid crystal device in the past in which a convex portion 40a to be described later is not formed, a portion D0 in which a domain is easily generated is indicated by a thin dot-dash line.

The light shielding member 2: a thick solid line
The pixel electrode 9a: a thick dashed line
The convex portion 40a: a thin solid line As illustrated in FIG. 6, the light shielding member 2 constituted by the first light shielding film 8a, the scan line 3a, the capacitance line 5a, the data line 6a, and the second light shielding film 7a is formed between the substrate main body 19 and the pixel electrode 9a, and the light shielding member 2 extends in the first direction X and the second direction Y along boundaries of the plurality of pixel electrodes 9a.

Here, the plurality of pixel electrodes 9a have the same configuration. Accordingly, focusing on one pixel electrode 9a of the plurality of pixel electrodes 9a, as illustrated in FIGS. 5 and 7, the light shielding member 2 includes a first light shielding member 2a extending in the first direction X and a second light shielding member 2b extending in the second direction Y intersecting the first direction X. Further, the light shielding member 2 includes a third light shielding member 2c that intersects the second light shielding member 2b and extends along the first direction X, and a fourth light shielding member 2d that intersects the first light shielding member 2a and the third light shielding member 2c and extends along the second direction Y.

Thus, when an intersection region between the first light shielding member 2a and the second light shielding member 2b is a first intersection region 2e, and an intersection region between the third light shielding member 2c and the fourth light shielding member 2d is a second intersection region 2f, the orientation direction (pre-tilt direction P) of the liquid crystal molecules 85 described with reference to FIGS. 1 and 4 is a direction that intersects the first direction X and the second direction Y and heads toward the second intersection region 2f, in a region where the pixel electrode 9a is provided in plan view. Here, the first intersection region 2e is a region where the first light shielding member 2a and the second light shielding member 2b mutually overlap in plan view when the first light shielding member 2a and the second light shielding member 2b are extended, and the second intersection region 2f is a region where the third light shielding member 2c and the fourth light shielding member 2d mutually overlap in plan view when the third light shielding member 2c and the fourth light shielding member 2d are extended. Further, the transistor 31 is provided corresponding to the second intersection region 2f, and the pixel electrode 9a is provided corresponding to the transistor 31.

The first light shielding member 2a and the third light shielding member 2c are equal in width (dimension in a direction intersecting an extending direction), and the second light shielding member 2b and the fourth light shielding member 2d are equal in width. In the present exemplary embodiment, all of the first light shielding member 2a, the second light shielding member 2b, the third light shielding member 2c, and the fourth light shielding member 2d are equal in width.

In the exemplary embodiment, at least a part of the semiconductor film 31a of the transistor 31 overlaps in plan view with the second intersection region 2f between the third light shielding member 2c and the fourth light shielding member 2d. Furthermore, the entire semiconductor film 31a overlaps with one of the third light shielding member 2c and the fourth light shielding member 2d. Accordingly, the contact hole 45a that electrically couples the pixel electrode 9a to the transistor 31 is provided at a position overlapping in plan view with the third light shielding member 2c. In the exemplary embodiment, the semiconductor film 31a extends linearly in the second direction Y so as to overlap in plan view with the data line 6a, thus the entire semiconductor film 31a overlaps in plan view with the light shielding member 2.

Note that, an aspect in which the semiconductor film 31a extends linearly in the first direction X so as to overlap in plan view with the scan line 3a, and an aspect in which the semiconductor film 31a is bent at an intermediate position in a length direction may be adopted. In this case as well, the semiconductor film 31a overlaps in plan view with the light shielding member 2, and at least a portion of the semiconductor film 31a overlaps in plan view with the second intersection region 2f between the third light shielding member 2c and the fourth light shielding member 2d.

6. Configuration of Convex Portion 40a

Figure 8:
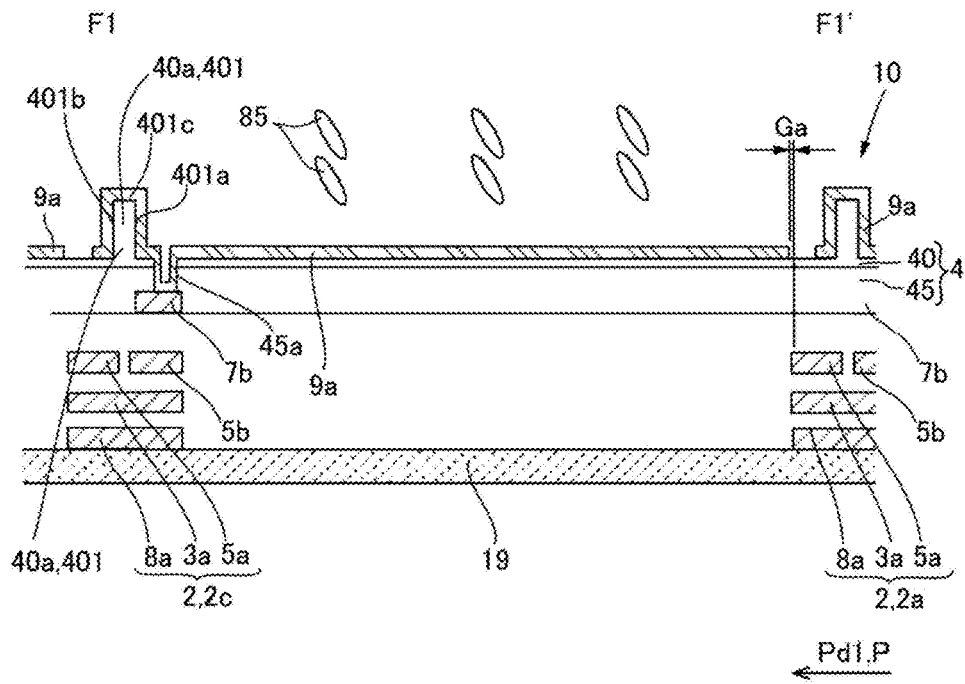
FIG. 8 is an explanatory diagram schematically illustrating an F1-F1' cross section in FIG. 7.
Figure 9:
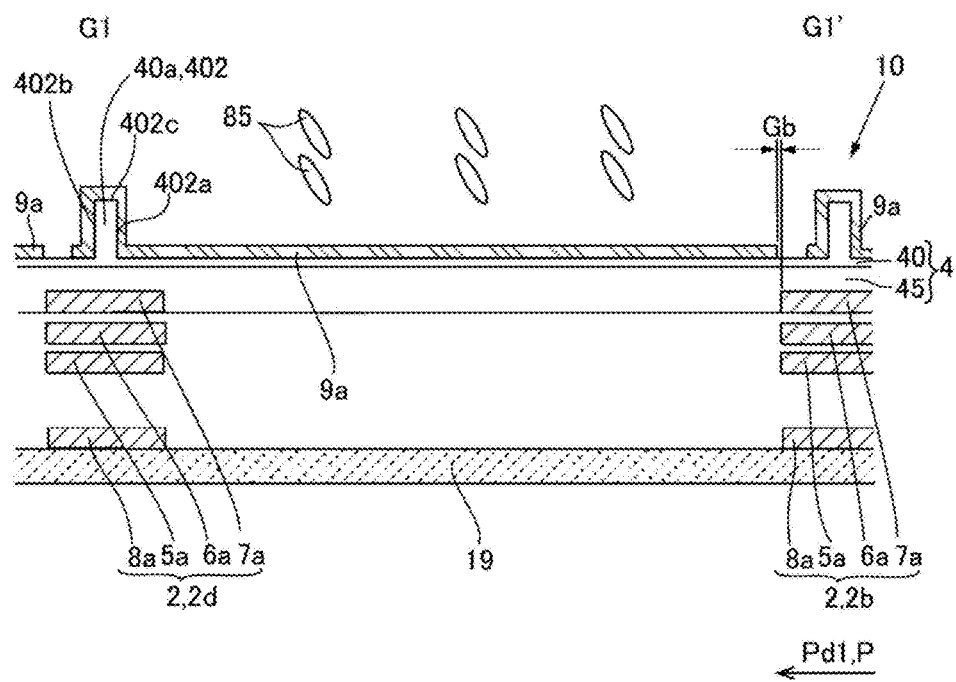
FIG. 9 is an explanatory diagram schematically illustrating a G1-G1' cross section in FIG. 7.

FIG. 8 is an explanatory diagram schematically illustrating the F1-F1' cross section in FIG. 7. FIG. 9 is an explanatory diagram schematically illustrating the G1-G1' cross section in FIG. 7. Note that, in FIGS. 8 and 9, the liquid crystal molecules 85 are also illustrated in order to be able to understand a relationship between the liquid crystal molecules 85 and the orientation direction thereof.

As illustrated in FIGS. 6 and 7, the insulating member 4 including the convex portion 40a extending in the first direction X and the second direction Y along the end portion of the pixel electrode 9a is provided, between a layer provided with the first light shielding member 2a, the second light shielding member 2b, the third light shielding member 2c, and the fourth light shielding member 2d and a layer provided with the pixel electrode 9a. In the exemplary embodiment, the insulating member 4 includes the first insulating film 45 and the second insulating film 40 provided between the first insulating film 45 and the pixel electrode 9a, and the convex portion 40a is provided at the second insulating film 40. Accordingly, the contact hole 45a that electrically couples the pixel electrode 9a to the transistor 31 is provided so as to penetrate through the insulating member 4 (the first insulating film 45 and the second insulating film 40) at a position overlapping in plan view with the third light shielding member 2c.

As illustrated in FIGS. 7, 8, and 9, the convex portion 40a extends at a center in a width direction of each of the third light shielding member 2c and the fourth light shielding member 2d. Here, the pixel electrode 9a does not overlap with the first light shielding member 2a and the second light shielding member 2b in a region along the first light shielding member 2a and the second light shielding member 2b.

In the exemplary embodiment, the pixel electrode 9a is provided along a side surface 401a and a side surface 401b on both sides in a width direction with respect to a first portion 401 that extends in the first direction X along the third light shielding member 2c of the convex portion 40a, in a region along the third light shielding member 2c and the fourth light shielding member 2d, and overlaps with an end face 401c. In addition, the pixel electrode 9a is provided along a side surface 402a and a side surface 402b on both sides in a width direction with respect to a second portion 402 that extends in the second direction Y along the fourth light shielding member 2d of the convex portion 40a, and overlaps with an end face 402c.

A part of the pixel electrode 9a overlaps in plan view with the third light shielding member 2c and the fourth light shielding member 2d. Compared to this, a part of the pixel electrode 9a do not overlap in plan view with the first light shielding member 2a and the second light shielding member 2b. Thus, in plan view, a gap Ga is present between the pixel electrode 9a and the first light shielding member 2a, and a gap Gb is present between the pixel electrode 9a and the second light shielding member 2b.

In the exemplary embodiment, the convex portion 40a is separated from the pixel electrode 9a adjacent to the pixel electrode 9a in plan view. More specifically, in plan view, the convex portion 40a is formed such that the first portion 401 and the second portion 402 are linked in the second intersection region 2f in an L-shape, and is provided so as to be separated from and is not linked to the convex portion 40a formed so as to overlap with the adjacent pixel electrode 9a.

7. Effect of Convex Portion 40a on Lateral Electric Field

Figure 10:
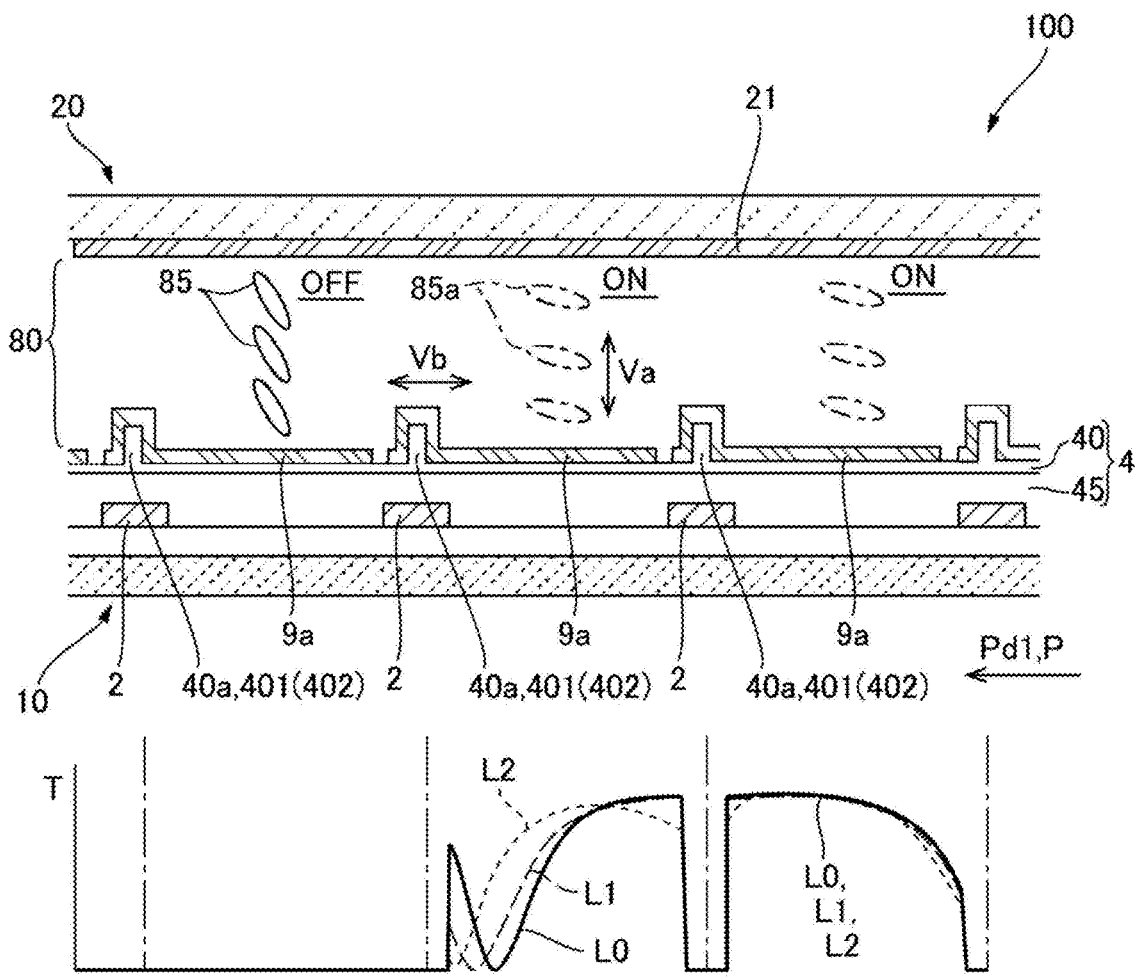

FIG. 10 is an explanatory diagram illustrating an effect of the convex portion 40a on a lateral electric field illustrated in FIG. 7 and the like. As illustrated in FIG. 10, in the liquid crystal device 100 of the exemplary embodiment, on the first substrate 10, in an orientation corresponding to the orientation direction of the liquid crystal molecules 85, at a boundary between adjacent pixels 100a, the pixel electrode 9a covers a part of the convex portion 40a. Thus, when the liquid crystal device 100 is driven, an effect of a lateral electric field is less likely to appear on an image, between a pixel having an off voltage applied to the pixel electrode 9a and a pixel having an on voltage applied to the pixel electrode 9a.

More specifically, it is assumed that a common potential applied to the common electrode 21 is 0 V, an off voltage of 0 V is applied to the pixel electrode 9a of a pixel in an off state (black display), and an on voltage of 5 V is applied to the pixel electrode 9a of a pixel in an on state (white display). In this case, in the pixel in the on state, the liquid crystal molecules 85 are significantly inclined from a normal direction with respect to the pixel electrode 9a, by a vertical electric field (indicated by an arrow Va) between the pixel electrode 9a and the common electrode 21. Here, when a lateral electric field (indicated by an arrow Vb) is generated between the pixel electrode 9a of the pixel in the on state and the pixel electrode 9a of an adjacent pixel in the off state, the inclination of the liquid crystal molecules 85 from the normal direction with respect to the pixel electrode 9a decreases between the adjacent pixels, and a black region (domain region) is to be generated at a position indicated by the portion D0 in FIG. 7 of the pixel in the on state. However, in the exemplary embodiment, the pixel electrode 9a covers the convex portion 40a, thereby increasing the vertical electric field (indicated by the arrow Va) between the pixel electrode 9a and the common electrode 21, while the lateral electric field (indicated by the arrow Vb) between the pixel electrode 9a and the adjacent pixel electrode 9a is reduced. Also, the domain region affected by the lateral electric field shifts to a side of a border region of the pixel.

For example, in FIG. 10, results of simulating a transmittance T at each position in a pixel when a thickness of the liquid crystal layer 80 was set to 2.1 µm and a height of the convex portion 40a was changed to 0 µm, 0.15 µm, and 0.35 µm are illustrated by a solid line L0, a long dashed line L1, and a short dashed line L2. When the convex portion 40a was not formed (when the height of the convex portion 40a was 0 µm), as indicated by the solid line L0, the domain region in which the transmittance T was decreased due to an effect of a vertical electric field was generated at a position separated from adjacent pixel and did not overlap with the light shielding member 2.

Compared to this, when the height of the convex portion 40a was 1.5 µm, as indicated by the long dashed line L1, the domain region where the transmittance T was decreased due to the effect of the vertical electric field shifted to a side of the adjacent pixel, and a part of the domain region overlapping with the light shielding member 2. When the height of the convex portion 40a was 3.5 µm, as indicated by the short dashed line L2, the domain region where the transmittance T was decreased due to the effect of the vertical electric field further shifted to the side of the adjacent pixel, and a substantially entirety of the domain region overlapping with the light shielding member 2. Therefore, in a pixel in an on state, the domain region where the transmittance T was decreased due to an effect of a lateral electric field was to overlap partially or entirely with the light shielding member 2.

8. Method for Manufacturing Liquid Crystal Device 100

Figure 11:
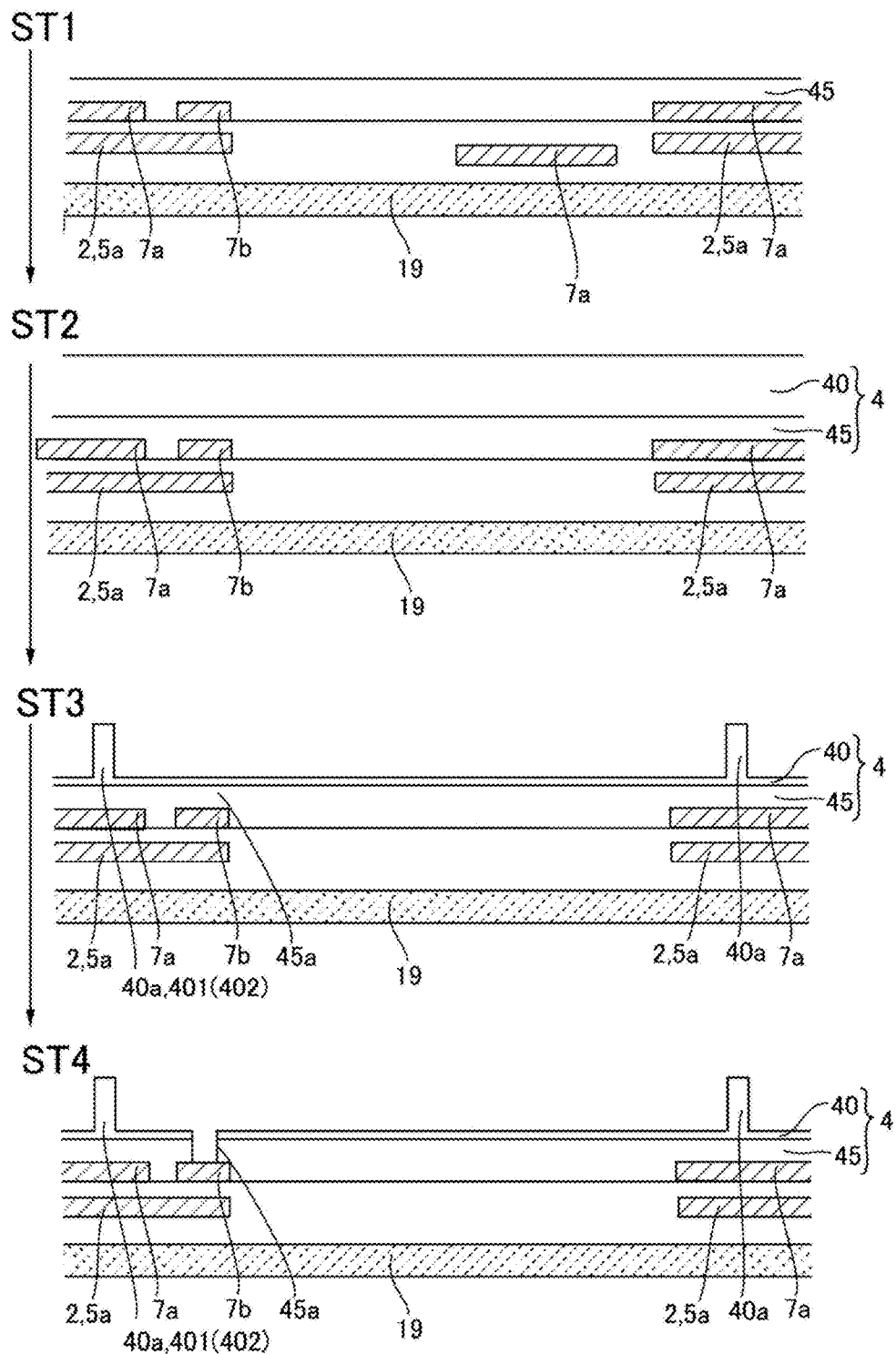
FIG. 11 is a step cross-sectional view illustrating a manufacturing step of the liquid crystal device illustrated in FIG. 1.
Figure 12:
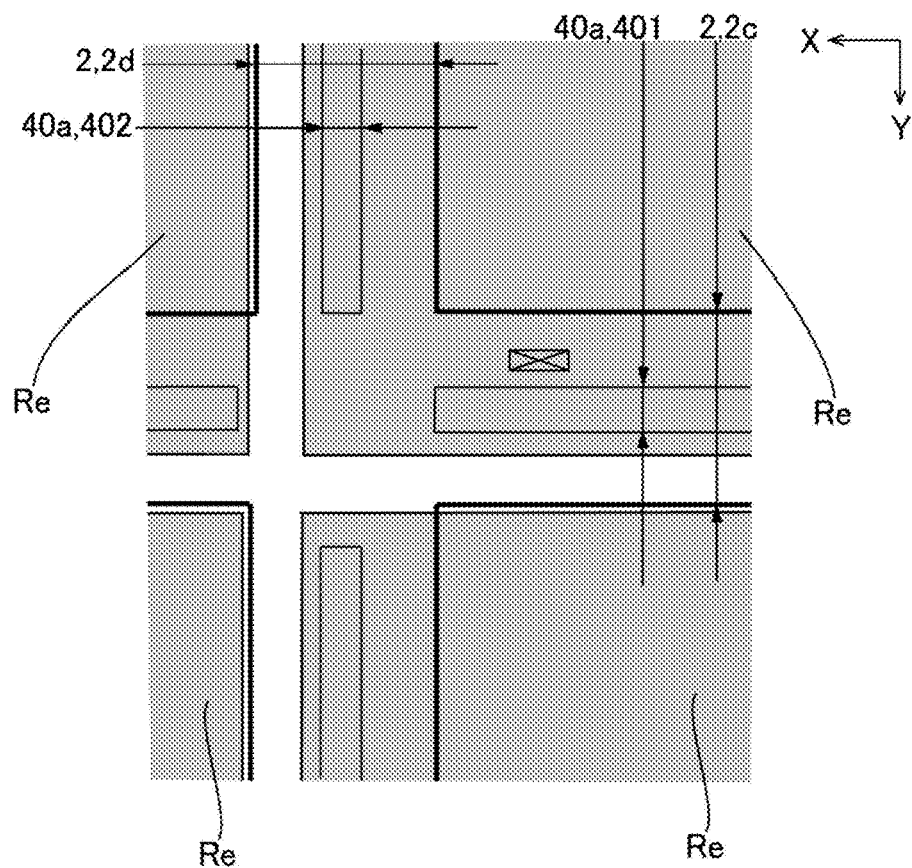
FIG. 12 is an explanatory diagram of a resist mask used in forming a pixel electrode in a manufacturing step of a liquid crystal device according to Exemplary Embodiment 1 of the disclosure.
Figure 13:
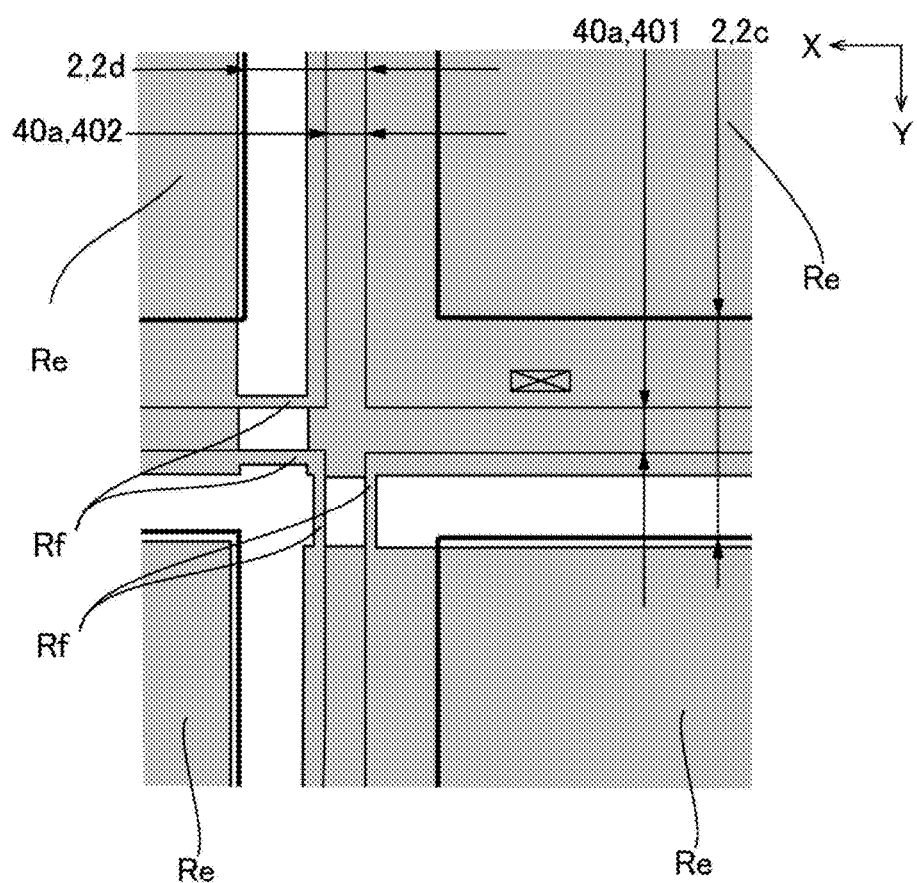
FIG. 13 is an explanatory diagram of a resist mask used in forming a pixel electrode in a manufacturing step of a liquid crystal device according to a comparative example of the disclosure.

FIG. 11 is a step cross-sectional view illustrating a manufacturing step for the liquid crystal device 100 illustrated in FIG. 1, and illustrates a step for forming the contact hole 45*a* and the convex portion 40*a*. FIG. 12 is an explanatory diagram of a resist mask used in forming the pixel electrode 9*a* in the manufacturing step for the liquid crystal device 100 according to Exemplary Embodiment 1 of the disclosure. FIG. 13 is an explanatory diagram of a resist mask used in forming the pixel electrode 9*a* in a manufacturing step for a liquid crystal device according to a comparative example of the disclosure. In FIG. 12 and FIG. 13, the resist mask is illustrated by a gray region.

First, in step ST1 illustrated in FIG. 11, up to the first insulating film 45 is formed. Next, in step ST2, the second insulating film 40 is stacked with respect to the first insulating film 45. The second insulating film 40 is a silicon oxide film formed by a plasma CVD method using Tetraethyl orthosilicate (TEOS) or the like, and a thickness of the second insulating film 40 is equal to or greater than the height of the convex portion 40*a*. Next, in step ST3, the second insulating film 40 is etched to form the convex portion 40*a*, while an etching mask is formed at a surface of the second insulating film 40. In the exemplary embodiment, dry etching is performed in step ST3. As a result, a side surface of the convex portion 40*a* is a vertical surface that is perpendicular to the substrate main body 19, or an inclined surface inclined obliquely with respect to the substrate main body 19.

Next, in step ST4, while another etching mask is formed at the surface of the second insulating film 40, the stacked film (insulating member 4) of the first insulating film 45 and the second insulating film 40 is etched to form the contact hole 45*a* illustrated in FIG. 6.

Next, a light-transmissive conductive film such as an ITO film is formed by a sputtering method or the like at the surface of the second insulating film 40, the conductive film is patterned to form the pixel electrode 9*a* illustrated in FIGS. 7 to 9. More specifically, in the pixel electrode forming step, after a photosensitive resist is applied to an upper layer of the conductive film, exposure and development are performed to form a resist mask Re, as illustrated in FIG. 12, and the conductive film is etched in this state. When performing such a step, the convex portion 40*a* is separated in plan view from the adjacent pixel electrode 9*a* on a lower layer side of the conductive film, and is not linked to the convex portion 40*a* that overlaps with the adjacent pixel electrode 9*a*. Therefore, unlike a case described below with reference to FIG. 13, the resist masks Re can be formed independently of each other, because the exposure and the development of the photosensitive resist can be performed appropriately. Thus, a short circuit between adjacent pixel electrodes 9*a* can be prevented.

Compared to this, as in an comparative example illustrated in FIG. 13, when the convex portions 40*a* overlapping with the adjacent pixel electrodes 9*a* are linked to each other, when exposure to a photosensitive resist is performed, an exposure failure occurs in a resist positioned at a side surface of the convex portion 40*a*, and after development, remaining resists Rf are generated on both sides of the convex portion 40*a*, and there is a possibility that the resist masks Re are linked to each other. In this case, after etching a conductive film, a remaining conductive film occurs at a position overlapping with the remaining resist Rf, and a short circuit is generated between adjacent pixel electrodes 9*a*.

9. Main Effects of Exemplary Embodiment

As described above, in the liquid crystal device 100 of the exemplary embodiment, the light shielding member 2 that extends along the edge of the pixel electrode 9*a* is formed at the first substrate 10, and for the liquid crystal molecules 85, in the region in which the pixel electrode 9*a* is provided in plan view, the orientation direction (pre-tilt direction P) is set in the direction intersecting the first direction X and the second direction Y and heading toward the second intersection region 2*f* between the third light shielding member 2*c* and the fourth light shielding member 2*d*. In addition, between the layer provided with the light shielding member 2 and the layer provided with the pixel electrode 9*a*, the insulating member 4 having the convex portion 40*a* extending in the first direction X and the second direction Y is provided along the end portion of the pixel electrode 9*a*, the pixel electrode 9*a* is provided so as not to overlap with the convex portion 40*a* in the region along the first light shielding member 2*a* and the second light shielding member 2*b*, and so as to overlap with the convex portion 40*a* in the region along the third light shielding member 2*c* and the fourth light shielding member 2*d*.

Therefore, as described with reference to FIG. 10, in the region along the third light shielding member 2*c* and the fourth light shielding member 2*d*, since at least a part of the pixel electrode 9*a* covers the convex portion 40*a*, the vertical electric field between the pixel electrode 9*a* and the common electrode 21 is strong, and the lateral electric field generated between adjacent pixel electrodes 9*a* is weakened. In addition, the region where the lateral electric field is generated due to the effect of the adjacent pixel electrode 9*a* shifts to the boundary region side of the adjacent pixel electrode 9*a*. Thus, even when a disturbance occurs in the orientation of the liquid crystal molecules 85 due to the effect of the lateral electric field, effects of such a disturbance are less likely to appear on an image. Thus, according to the exemplary embodiment, deterioration in quality of an image caused by the disturbance in the orientation of the liquid crystal molecules 85 caused by the lateral electric field can be appropriately suppressed, and thus an image with high quality can be displayed.

In addition, even when a disturbance occurs in the orientation of the liquid crystal molecules 85 due to the effect of the lateral electric field, a part or all of a region where such a disturbance occurs overlaps with the third light shielding member 2*c* and the fourth light shielding member 2*d*. Thus, even when a disturbance occurs in the orientation of the liquid crystal molecules 85 due to the effect of the lateral electric field, such a disturbance can be hidden by the third light shielding member 2*c* and the fourth light shielding member 2*d*. Therefore, the effects of disturbance of the orientation of the liquid crystal molecules 85 are less likely to appear on an image. Thus, according to the exemplary embodiment, deterioration in quality of an image caused by the disturbance in the orientation of the liquid crystal molecules 85 caused by the lateral electric field can be appropriately suppressed, and thus an image with high quality can be displayed.

In addition, the pixel electrode 9*a* overlaps with the convex portion 40*a* in the region overlapping with the third light shielding member 2*c* and the fourth light shielding member 2d, as a result, in the pixel electrode 9a, an overlap width in the second direction Y with the third light shielding member 2c is greater than an overlap width in the second direction Y with the first light shielding member 2a, and an overlap width in the first direction X with the fourth light shielding member 2d is greater than an overlap width in the first direction X with the second light shielding member 2b. Therefore, even when a disturbance occurs in the orientation of the liquid crystal molecules 85 due to the effect of the lateral electric field on a side of the third light shielding member 2c and the fourth light shielding member 2d, a wide range of the region where such a disturbance occurs overlaps with the third light shielding member 2c and the fourth light shielding member 2d. Thus, even when a disturbance occurs in the orientation of the liquid crystal molecules 85 due to the effect of the lateral electric field, effects of such a disturbance are less likely to appear on an image. Thus, according to the exemplary embodiment, an image with high quality can be displayed.

Further, the contact hole 45a that electrically couples the transistor 31 and the pixel electrode 9a can be provided in a region overlapping with the third light shielding member 2c, even when a semiconductor film of the transistor 31 for pixel switching is provided so as to overlap with the second intersection region 2f between the third light shielding member 2c and the fourth light shielding member 2d.

Furthermore, the convex portion 40a is separated from the adjacent pixel electrode 9a in plan view, and is not linked to the convex portion 40a that overlaps with the adjacent pixel electrode 9a. Therefore, as described with reference to FIG. 12 and FIG. 13, the exposure and the development of the photosensitive resist can be performed appropriately, thus, a short circuit between adjacent pixel electrodes 9a can be prevented.

Exemplary Embodiment 2

Figure 14:
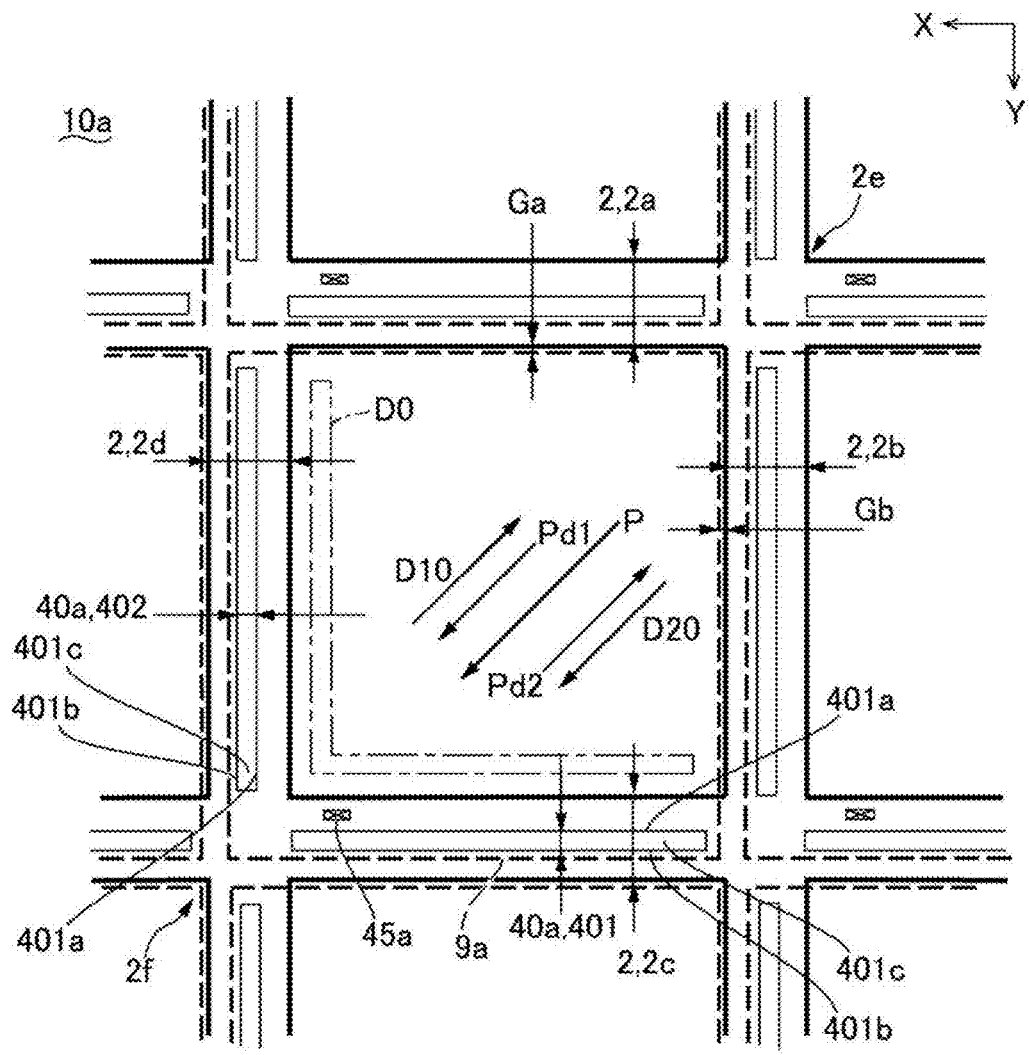
FIG. 14 is an explanatory diagram of a liquid crystal device according to Exemplary Embodiment 2 of the disclosure.

FIG. 14 is an explanatory diagram of the liquid crystal device 100 according to Exemplary Embodiment 2 of the disclosure, and is an explanatory diagram schematically illustrating a planar layout of the pixel electrode 9a, the convex portion 40a, and the like illustrated in FIG. 5. Note that, a basic configuration of the liquid crystal device 100 according to the exemplary embodiment is similar to that of the liquid crystal device 100 according to Exemplary Embodiment 1 of the disclosure, and thus, common portions are assigned identical reference signs and a description thereof will be omitted.

In Exemplary Embodiment 1, the convex portion 40a has the L-shape in which the first portion 401 extending in the first direction X along the third light shielding member 2c, and the second portion 402 extending in the second direction Y along the fourth light shielding member 2d are linked in plan view at the second intersection region 2f, but in the exemplary embodiment, as illustrated in FIG. 14, the first portion 401 is not linked to the second portion 402 in plan view at the second intersection region 2f. In other words, the convex portions 40a are provided so as to be separated from each other in plan view in a region along the third light shielding member 2c and a region along the fourth light shielding member 2d. According to such a configuration, effects similar to the effects in Exemplary Embodiment 1 are also provided.

Other Exemplary Embodiments

In Exemplary Embodiments 1 and 2 described above, convex portion 40a is formed by etching the insulating member 4 by dry etching in step ST3 illustrated in FIG. 11, but the convex portion 40a may be formed by etching the insulating member 4 by wet etching. In this case, the side surfaces 401a and 401b (side surfaces 402a and 402) of the convex portion 40a are curved surfaces. Such a configuration also provides advantages similar to Exemplary Embodiments 1 and 2.

In the exemplary embodiments described above, although the disclosure is applied to the liquid crystal device in a VA mode, the disclosure may also be applied to a liquid crystal device in a TN mode, an OCB mode, or the like.

Installation Example to Electronic Apparatus

Figure 15:
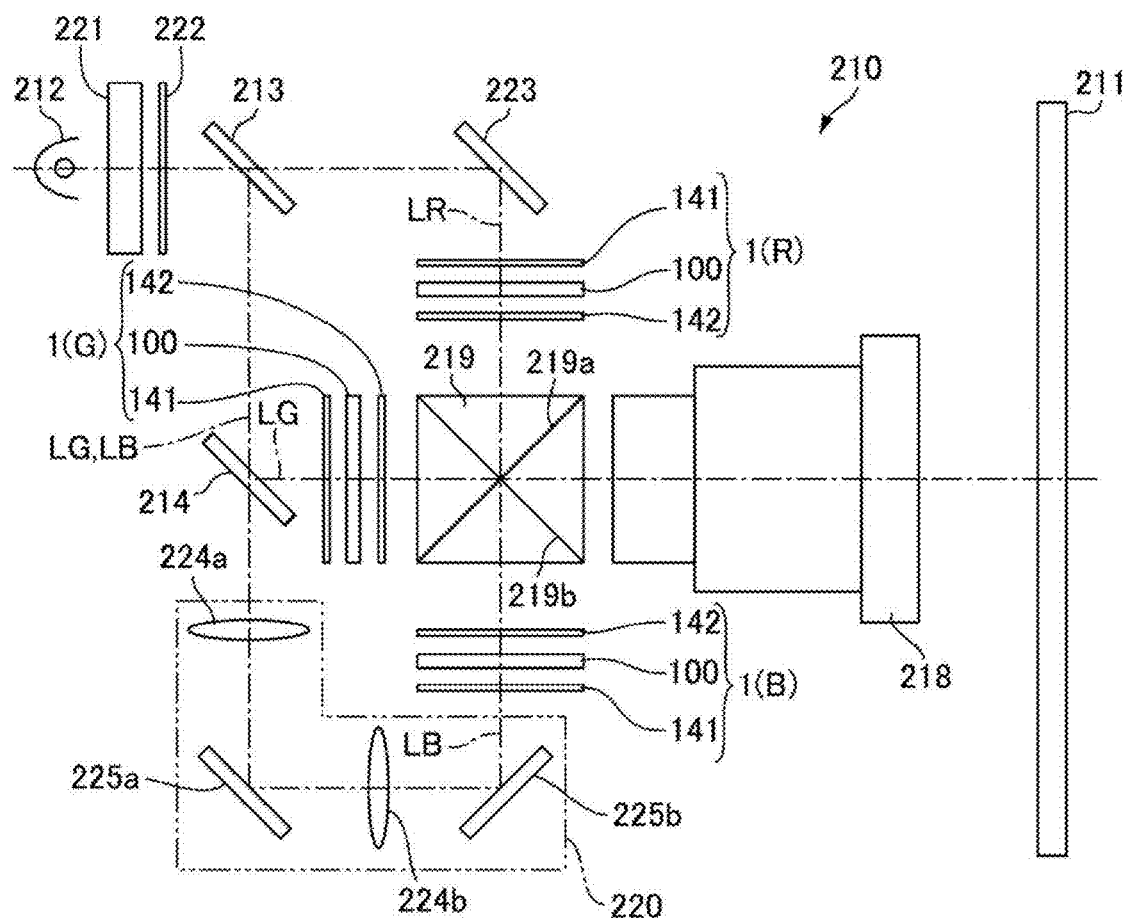
FIG. 15 is a schematic configuration diagram of a projection-type display apparatus employing a liquid crystal device to which the disclosure is applied.

FIG. 15 is a schematic configuration diagram of a projection-type display apparatus employing the liquid crystal device 100 to which the disclosure is applied. Note that, in the descriptions below, although a plurality of light valves (a light valve for red 1 (R), a light valve for green 1 (G), and a light valve for blue 1 (B)) are used to which light in mutually different wavelength regions are supplied, and the liquid crystal device 100 to which the disclosure is applied is used in any of the light valves. At this time, a first polarization plate 141 and a second polarization plate 142 are disposed in a cross Nichol manner with respect to the liquid crystal device 100.

A projection-type display apparatus 210 illustrated in FIG. 15 is a forward projection type projector configured to project an image on a screen 211 provided in front of the projector. The projection-type display apparatus 210 includes a light source unit 212, dichroic mirrors 213 and 214, the three light valves (light valve for red 1 (R), light valve for green 1 (G), and light valve for blue 1 (B)), a projection optical system 218, a cross dichroic prism 219 (color synthesis optical system), and a relay system 230.

The light source unit 212 is configured by an extra-high-pressure mercury lamp for supplying light source light including red light, green light, and blue light, for example. The dichroic mirror 213 is configured to be transmissive of red light LR from the light source unit 212 and reflective of green light LG and blue light LB. The dichroic mirror 214 is configured to be transmissive of the blue light LB and reflective of the green light LG in the green light LG and the blue light LB reflected by the dichroic mirror 213. In this way, the dichroic mirrors 213 and 214 constitute a color separation optical system configured to separate light emitted from the light source unit 212 into the red light LR, the green light LG, and the blue light LB. An integrator 221 and a polarization conversion element 222 are sequentially arranged, between the dichroic mirror 213 and the light source unit 212, from the light source unit 212. The integrator 221 equalizes illuminance distribution of the light irradiated from the light source unit 212. The polarization conversion element 222 converts the light from the light source unit 212 into linear polarized light having a specific vibration direction such as s-polarized light.

The light valve for red 1 (R) modulates the red light LR (illumination light) transmitting the dichroic mirror 213 and reflected by a reflection mirror 223 in accordance with image signals, and emits the modulated red light LR (modulated light) toward the cross dichroic prism 219.

The light valve for green 1 (G) modulates the green light LG (illumination light) reflected by the dichroic mirror 213 and then reflected by the dichroic mirror 214, in accordance with image signals, and emits the modulated green light LG (modulated light) toward the cross dichroic prism 219.

The light valve for blue 1 (B) modulates the blue light LB (illumination light) reflected by the dichroic mirror 213, transmitted through the dichroic mirror 214, and then passed through the relay system 230 in accordance with image signals, and emits the modulated blue light LB (modulated light) toward the cross dichroic prism 219.

The relay system 230 includes relay micro lenses 224a and 224b and reflection mirrors 225a and 225b. The relay micro lenses 224a and 224b are provided to prevent a loss of light due to a long optical path of the blue light LB. The relay micro lens 224a is disposed between the dichroic mirror 214 and the reflection mirror 225a.

The relay micro lens 224b is disposed between the reflection mirrors 225a and 225b. The reflection mirror 225a is disposed to reflect, toward the relay micro lens 224b, the blue light LB transmitted through the dichroic mirror 214 and then emitted from the relay micro lens 224a. The reflection mirror 225b is disposed to reflect the blue light LB emitted from the relay micro lens 224b toward the light valve for blue 1 (B).

The cross dichroic prism 219 serves as a color combining optical system in which two dichroic films 219a and 219b are orthogonally arranged in an X shape. The dichroic film 219a reflects the blue light LB and transmits the green light LG. The dichroic film 219b reflects the red light LR and transmits the green light LG.

Accordingly, the cross dichroic prism 219 is configured to synthesize the red light LR, the green light LG, and the blue light LB modulated by the light valve for red 1 (R), light valve for green 1 (G), and light valve for blue 1 (B) respectively and to emit the synthesized light toward the projection optical system 218. The projection optical system 218, which includes a projection micro lens (not illustrated), is configured to project the light synthesized by the cross dichroic prism 219 onto the screen 211.

Other Electronic Apparatuses

The liquid crystal apparatus 100 to which the disclosure is applied, in a projection-type display apparatus, may use, as a light source unit, an LED light source or a laser light source configured to emit light in various colors, and the like to supply light in various colors emitted from the light source to another liquid crystal device. The disclosure may also be used as a measure for domains of the liquid crystal device 100 used in a projection-type display apparatus that shifts an axis of image light emitted from the liquid crystal device 100 in a uniaxial direction or a biaxial direction to increase a resolution.

In addition, the liquid crystal device 100 is not limited to a front projection type projector that projects a projection image from a side on which the projection image is observed, but may also be used in a rear projection type projection type projector that projects a projection image from a side opposite to the side on which the projection image is observed.

Further, an electronic apparatus to which the liquid crystal device 100 is applicable is not limited to the projection-type display apparatus 210. For example, the liquid crystal device 100 may be used as a projection-type head-up display (HUD), a direct viewing-type head-mounted display (HMD), and a display unit of an information terminal device such as an electronic book, a personal computer, a digital camera, a liquid crystal television, a view finder-type or a monitor direct viewing type video recorder, a car navigation system, an electronic note book, and POS.

What is claimed is:

1. A liquid crystal device, comprising:
a liquid crystal layer including liquid crystal molecules;
a first light shielding member extending along a first direction;
a second light shielding member extending along a second direction intersecting the first direction;
a third light shielding member intersecting the second light shielding member and extending along the first direction;
a fourth light shielding member intersecting the first light shielding member and the third light shielding member and extending along the second direction;
a transistor provided corresponding to an intersection region of the third light shielding member and the fourth light shielding member;
a pixel electrode provided corresponding to the transistor, the pixel electrode having an end portion provided along each of the first light shielding member, the second light shielding member, the third light shielding member, and the fourth light shielding member; and
an insulating member including a convex portion provided along the end portion of the pixel electrode, between a layer provided with the first light shielding member, the second light shielding member, the third light shielding member, and the fourth light shielding member, and a layer provided with the pixel electrode, wherein
in a region provided with the pixel electrode in a plan view, an orientation direction of the liquid crystal molecules is set in a direction toward the intersection region, the direction intersecting the first direction and the second direction,
the convex portion overlaps in the plan view with the pixel electrode in a region along the third light shielding member and a region along the fourth light shielding member,
the pixel electrode overlaps in the plan view with the third light shielding member and the fourth light shielding member at regions that cover the convex portion and does not overlap in the plan view with the first light shielding member and the second light shielding member, and
the convex portion is separated in the plan view from a pixel electrode adjacent to the pixel electrode.

2. The liquid crystal device according to claim 1, wherein the convex portion is provided in the regions along the third light shielding member and the fourth light shielding member, among the first light shielding member, the second light shielding member, the third light shielding member, and the fourth light shielding member.

3. The liquid crystal device according to claim 1, wherein the convex portions are provided so as to be separated from each other in the plan view in the region along the third light shielding member and the region along the fourth light shielding member.

4. The liquid crystal device according to claim 1, wherein the pixel electrode is provided so as to be separated from the first light shielding member and the second light shielding member in the plan view.

5. The liquid crystal device according to claim 1, wherein the insulating member includes a contact hole configured to electrically couple the transistor and the pixel electrode, in a region overlapping with the third light shielding member.

6. The liquid crystal device according to claim 1, wherein the liquid crystal molecules have negative dielectric anisotropy, and
the liquid crystal molecules are inclined with respect to a normal line direction to the pixel electrode such that a first end portion positioned on a side opposite to the pixel electrode is positioned closer to a side of the intersection region than a second end portion positioned on a side of the pixel electrode.

7. The liquid crystal device according to claim 1, wherein the pixel electrode is provided along both side surfaces of the convex portion covering the convex portion.

8. An electronic apparatus, comprising the liquid crystal device according to claim 1.

* * * * *